March 5, 1935.  J. A. BORDEN  1,993,589
HOLDER FOR ROAD MAPS AND THE LIKE
Filed Sept. 1, 1933
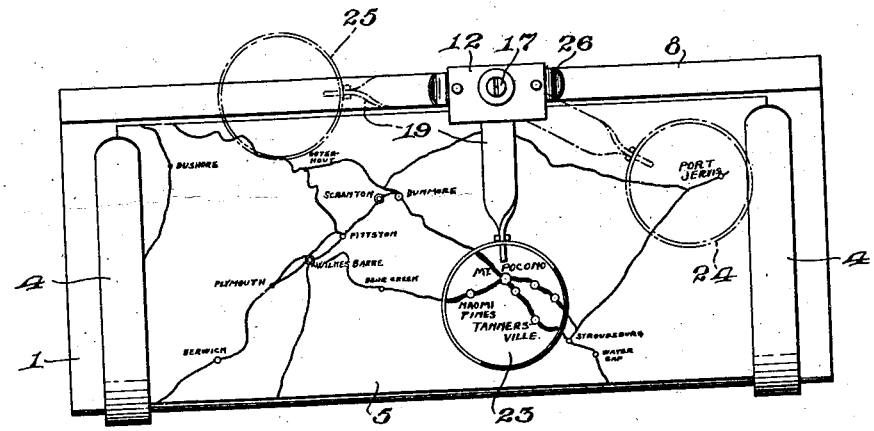
Fig. 1.
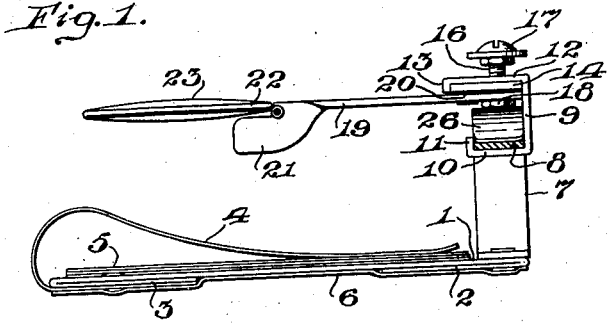
Fig. 2.
Fig. 4.
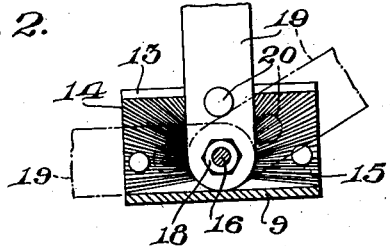
Fig. 3.
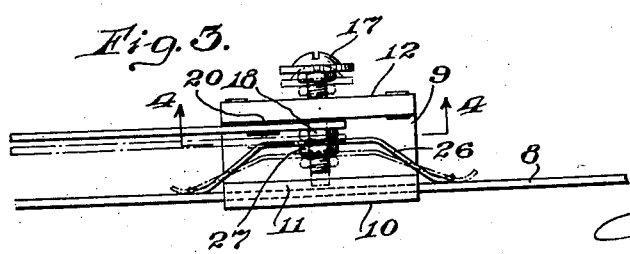
Inventor
John A. Borden,
by J. Stuart Freeman
Attorney.

Patented Mar. 5, 1935

1,993,589

UNITED STATES PATENT OFFICE 1,993,589

HOLDER FOR ROAD MAPS AND THE LIKE

John Alfred Borden, Philadelphia, Pa.

Application September 1, 1933, Serial No. 687,757

3 Claims. (Cl. 88—39)

The object of the invention is to provide improvements in means for holding maps, books, and in fact any illustrated or printed matter whatever, and particularly in such a manner that the contents of the same may be read or viewed, while one is engaged in another pursuit, such for instance as the reading of a map or directions of travel while driving a vehicle.

Another object is to provide such a device in a form which can be used as a unit of itself, or can be incorporated in and as a unitary or detachable part of or as an accessory to the body, dash, steering column, or other suitable portion of the vehicle.

A further object is to provide a device in which the map or other illustrated or reading matter may be readily inserted, and from which it can be as easily removed for reversal and readjustment, as the course of the vehicle for instance progresses.

Still another object is to provide in such a device an adjustable mounting for a magnifying glass, such as will permit said glass to be readily moved upwardly, downwardly, or to and fro across the surface of the map or the like, together with means to yieldingly maintain said glass in such adjusted position.

And a still further object is to provide in such a device a construction, which while of relative inexpensive manufacture, is nevertheless of rugged formation, and adaptable to the usual continuous and rough use for which such devices are designed, and at the same time being unlikely to get out of order.

With these objects in mind, the invention comprises further details of construction and operation, which are fully brought out in the following description, when read in conjunction with the accompanying drawing, in which Fig. 1 is a top plan view of a holder comprising one embodiment of the invention;

Fig. 2 is an end elevation of the same;

Fig. 3 is an enlarged elevational view of the adjustable support for the magnifying glass; and Fig. 4 is a section on the line 4—4 of Fig. 3.

Referring to the drawing, there is illustrated a planular base 1, preferably comprising a sheet metal member, the top or rear and the bottom or forward edge portions 2 and 3, respectively, being reversely folded to provide stiffening means, while to any suitable spaced regions of the rear or underside of said base are secured resilient clips or fingers 4, which overhang the forward or upper surface of said base, and removably secure thereto any desired form of map 5, sheet, leaflet, or the like, hereinafter comprised within the term map. The said base may be either fixedly or detachably secured to the dash of a vehicle such as an automobile, to the instrument board or an extension thereof, to the steering column, or to any other suitable part of the vehicle, or may have its rear or bottom surface merely covered with felt 6, or the like, and laid upon one's lap or upon the seat beside the driver.

Secured to and rising from the laterally opposite sides of the base 1 are the angularly directed legs 7 of a horizontally extending bar 8. Slidably mounted upon said bar is a bracket, comprising an upwardly extending central portion 9, the lower end 10 of which passes beneath and in slidable engagement with the under surface of said bar, and terminates in a lug 11 upon the opposite or forward side of the bar to prevent said bracket shifting transversely thereof. The upper end portion 12 of said bracket extends forwardly and overhangs said bar in spaced relation therewith, and also terminates in a lug 13, which with said central portion operatively positions a plate 14, provided upon its under surface with radial corrugations 15.

Thru the upper portion 12 of said bracket and said plate slidably extends a pin or bolt 16, having a manually depressible head 17, and bearing beneath said upper bracket portion a nut 18, which supports an arm 19 thru which said pin or bolt also extends, and about which said arm is adapted to oscillate. This arm is provided with a stud 20, in slightly spaced relation with said bolt or pin, and in frictional engagement with said corrugations, in order to yieldingly position said arm in any desired angular relation with said supporting bar. The outer or opposite end of said arm terminates in a pointer 21 above which is suitably secured a rim 22, in which is operatively supported a magnifying glass 23. This glass is positioned at the proper distance from said base to insure its being focused upon the map upon said base, and by virtue of its being oscillatable about said pin or bolt, it is maintained in focus at all times, and as a result of the individual or combined movements of said arm with respect to said pin or bolt, and of said bracket with respect to said bar, said glass may be readily focused upon any portion of said map, as indicated by the solid-line position and the dot-and-dash line position 24, or may be shifted into such an inoperative position as that represented by the dot-and-dash lines 25, in Fig. 1.

Said pin or bolt also extends thru the central portion of a resilient strap 26, the opposite ends of which are at all times in sliding frictional engagement with the upper surface of said supporting bar, and said strap being secured to said bracket by a nut 27 upon said bolt. Thus, by means of the engagement of said stud with said corrugated plate and of said strap with said bar, said magnifying glass may be manually moved to any desired position, and it will be maintained there until removed therefrom, irrespective of jars and jolts to which it may be subjected by irregular movement of the vehicle. In Fig. 3 the dot-and-dash outlines of said arm and strap indicate their depressed positions, either as said stud rides over said corrugations, or as they are shifted by manually depressing said bolt head 17.

I am aware that the invention may be embodied in other specific forms without departing from the spirit or essential attributes thereof, and I therefore desire the present embodiment to be considered in all respects as illustrative and not descriptive, reference being had to the appended claims rather than to the foregoing description to indicate the scope of the invention.

Having thus described my invention, what I claim as new and desire to secure by Letters Patent of the United States is:—

1. The combination of a planular base, a transversely extending rod of polygonal cross section operatively carried by and parallel with respect to said base, a bracket only longitudinally slidably carried by said rod and having a corrugated surface, an arm pivotally carried by said bracket, and a stud carried by said arm and alone engageable with said surface, and said arm being adapted to so carry a magnifying glass that the glass may assume any desired position in a plane parallel with said base and at fixed focal distance with respect thereto.

2. The combination of a base, a transversely extending rod of polygonal cross section carried by said base and in parallel relation therewith, a bracket having a plane surface in frictional engagement with said rod and provided with a corrugated surface, the engagement of said bracket with said arm permitting longitudinal movement but preventing relative angular movement therebetween, and an arm pivotally supported by said bracket and provided with a stud in frictional engagement with said surface, and said arm being adapted to so support a magnifying glass that the glass may be moved in a fixed plane at focal distance from said base thru the independent or combined movements of said bracket and said arm.

3. The combination of a base, a transversely extending rod of polygonal cross section carried by said base and in parallel relation therewith, a bracket in frictional engagement with said rod, an arm pivotally supported by said bracket, and adapted to so support a magnifying glass that the glass may be moved in a plane at focal distance from said base thru the independent or combined movements of said bracket and said arm, and resilient means carried by said bracket and frictionally engaging one side only of said rod, to positively prevent relative angular movement between said rod and said bracket, and to resist accidental shifting of said bracket with respect to said rod.

JOHN ALFRED BORDEN.